United States Patent [19]

Weterings et al.

[11] Patent Number: 4,514,365
[45] Date of Patent: Apr. 30, 1985

[54] PROCESS FOR RECOVERING A URANIUM-CONTAINING CONCENTRATE AND PURIFIED PHOSPHORIC ACID FROM A WET PROCESS PHOSPHORIC ACID CONTAINING URANIUM

[75] Inventors: Cornelis A. M. Weterings, Stein; Johannes A. Janssen, Schinveld, both of Netherlands

[73] Assignee: Stamicarbon B.V., Geleen, Netherlands

[21] Appl. No.: 439,599

[22] Filed: Nov. 5, 1982

Related U.S. Application Data

[63] Continuation of Ser. No. 115,248, Jan. 21, 1980.

[30] Foreign Application Priority Data

Jan. 25, 1979 [NL] Netherlands ..................... 7900579
Jan. 25, 1979 [NL] Netherlands ..................... 7900580
Jan. 25, 1979 [NL] Netherlands ..................... 7900581

[51] Int. Cl.$^3$ .................... C01G 43/06; C01G 43/00
[52] U.S. Cl. .......................... 423/15; 423/8; 423/313; 423/321 S; 423/11
[58] Field of Search ............. 423/8, 11, 15, 18, 313, 423/321 S, 321 R

[56] References Cited

U.S. PATENT DOCUMENTS

| | | | |
|---|---|---|---|
| T952,002 | 11/1976 | Walters et al. | 423/321 S X |
| T970,007 | 5/1978 | McCullough et al. | 423/11 X |
| 2,873,165 | 2/1959 | Bailes et al. | 423/18 |
| 3,764,657 | 10/1973 | Frankenfeld et al. | 423/321 R |
| 3,862,298 | 1/1975 | Beltz et al. | 423/321 R X |
| 3,894,143 | 7/1975 | Von Semel et al. | 423/321 R X |
| 3,975,178 | 8/1976 | McCullough et al. | 423/321 S X |
| 4,070,443 | 1/1978 | Kikuchi et al. | 423/321 R |
| 4,152,402 | 5/1979 | Walters et al. | 423/321 S |
| 4,180,545 | 12/1979 | McCullough et al. | 423/8 |
| 4,236,911 | 12/1980 | McCullough et al. | 423/321 S X |

FOREIGN PATENT DOCUMENTS

| | | |
|---|---|---|
| 1342344 | 1/1974 | United Kingdom . |
| 1344651 | 1/1974 | United Kingdom . |
| 1556478 | 11/1979 | United Kingdom . |

*Primary Examiner*—Edward A. Miller
*Assistant Examiner*—Matthew A. Thexton
*Attorney, Agent, or Firm*—Cushman, Darby & Cushman

[57] ABSTRACT

A process for recovering from a wet process phosphoric acid which contains uranium, a uranium containing concentrate and a purified phosphoric acid. The wet process phosphoric acid is treated with a precipitant in the presence of a reducing agent and an aliphatic ketone.

12 Claims, No Drawings

PROCESS FOR RECOVERING A URANIUM-CONTAINING CONCENTRATE AND PURIFIED PHOSPHORIC ACID FROM A WET PROCESS PHOSPHORIC ACID CONTAINING URANIUM

This is a continuation of application Ser. No. 115,248, filed Jan. 21, 1980.

BACKGROUND OF THE INVENTION

The present invention relates to a process for recovering a uranium containing concentrate and a purified phosphoric acid from a wet process phosphoric acid containing uranium. The wet process phosphoric acid is treated with a precipitant in the presence of a reducing agent and an organic dispersant. The resultant precipitate is then separated out with the phosphoric acid being recovered from the remaining mixture of phosphoric acid and dispersant.

A related process is disclosed in U.S. Defensive Publication No. T970,007 where the organic dispersant is a water miscible organic solvent, such as methanol, ethanol, and/or isopropanol, and the precipitant is ammonia or an ammonium salt. The uranium is recovered by a known method from the uranium containing precipitate which is formed. The solvent used, e.g., methanol is recovered by distillation and rectification, and is recycled.

One major disadvantage of the process disclosed in U.S. Defensive Publication No. T970,007 is that for effecting a satisfactory precipitation of the uranium from the phosphoric acid very large quantities of ammonia and/or ammonium salts are needed. This results in a relatively high proportion of the phosphoric acid being bound as ammonium phosphate. Furthermore, the ammonium phosphate is so contaminated that it is usually only suitable for use as a fertilizer. In addition, the amount of the phosphate precipitate containing the uranium is fairly large, which means the processing of the precipitate is also rather costly. Another major disadvantage of the process disclosed in U.S. Defensive Publication No. T970,007 is that very large quantities of solvent are needed. The solvent must be recovered through, for example, distillation and rectification which means considerable capital expenditures for equipment as well as increased energy consumption during the solvent recovery steps. Necessarily, these steps result in some losses of solvent.

DESCRIPTION OF THE INVENTION

The present invention, however, overcomes these disadvantages by providing a process offering the possibility of virtually quantitative recovery of the uranium and other metals contained in the phosphoric acid through use of relatively small amounts of precipitant and with appreciably smaller quantities of organic dispersant.

Remarkably, the process of the present invention achieves this by using as the organic dispersant an aliphatic ketone such as acetone and methylethylketone. Even more remarkable is that the less expensive acetone may be used and is, in fact, preferable in the process of the present invention with the amount of ketone required varying within wide limits, depending, in part, on the quantity and on the kind of precipitant used.

The precipitant used in the process of the present invention can be ammonia and/or ammonium salts, such as ammoniumcarbonate, ammoniumbicarbonate, ammoniumnitrate and/or ammoniumphosphate. When using such a precipitant the amount of precipitant will be from about 0.06% to about 5% by weight, calculated as $NH_3$, while the amount of ketone will be from about 250% to about 900% by weight, calculated in relation to the amount by weight of $P_2O_5$ in the phosphoric acid in order to achieve a uranium precipitation efficiency in excess of about 90%. If a phosphoric acid is used which has a $P_2O_5$ concentration of 50% by weight or more, the amount of precipitant will, preferably, be from about 0.1% to about 1% by weight, calculated as $NH_3$, and the amount of ketone will be from about 300% to about 600% by weight relative to the quantity of $P_2O_5$.

Preferably, the precipitant used is an inorganic fluorine compound. This will result in using less ketone, and importantly, the losses of phosphoric acid due to the formation of ammonium phosphate are reduced considerably or even completely eliminated. The inorganic fluorine compounds which can be used include ammoniumfluoride, alkali metal fluorides, earthalkali metal fluorides, hydrogen fluoride, and mixtures thereof. Silicofluorides, hydrofluosilicic acid, mixed fluorides such as cryolite, and acid fluorides such as ammonium bifluoride can also be used. It has been discovered that ammonium fluoride is the most preferably precipitant with its major advantage being that a smaller quantity of it is needed for precipitating any given quantity of uranium. The selected fluorine compound can be added in various ways to the phosphoric acid, e.g., as a solid, in liquid form, or as a solution.

The quantity of fluorine compound required may vary within wide limits, depending, in part, on the quantity of ketone used.

In order to reach a uranium precipitation efficiency in excess of 90% an amount of ketone ranging from about 120% to about 900% by weight, and an amount of fluorine compound ranging from about 0.15% to about 7% by weight, calculated as fluorine in relation to $P_2O_5$ are used in accordance with the process of the present invention. Preferably, a quantity of fluorine compound ranging from about 0.5% to about 5% by weight, calculated as fluorine in relation to the $P_2O_5$, and a quantity of ketone ranging from about 160% to about 450% by weight, calculated in relation to the $P_2O_5$, are used.

When acetone is used as the dispersant and ammonium fluoride is used as the precipitant, the amount of acetone preferably ranges from about 200% to about 450% by weight and the amount of ammonium fluoride preferably ranges from about 0.5% to about 3% by weight, calculated as fluorine, in relation to the amount by weight of $P_2O_5$ in the phosphoric acid.

The process of the present invention also employs a reducing agent which is added to the phosphoric acid to reduce the uranium compounds from the hexavalent to the tetravalent state. It is advantageous to add the reducing agent after the precipitant, because in the process of the present invention a smaller amount of precipitate is formed, but which nevertheless contains virtually all of the uranium. Among the reducing agents that can be used are, for example, powdered metallic iron, zinc and aluminium. Optionally, electrolytic reduction may be utilized. Preferably, powdered metallic iron is used as the reducing agent. The amount of reducing agent is not critical, but the quantity used must be sufficient to reduce all of the uranium to the tetravalent state.

The present process is preferably conducted by first adding the precipitant to the phosphoric acid, and then adding the ketone to the resultant mixture. Any small amount of precipitate that may have formed after addition of the precipitant may, if so desired, be removed, for instance by, filtration, before the phosphoric acid is subjected to any further treatment.

The process according to the present invention can be applied to any kind of wet process phosphoric acid. Both the so called green wet process phosphoric acid which is obtained from calcined rock phosphates and the so called black wet process phosphoric acid which contains a quantity of organic contaminants can be subjected to the process according to the present invention without requiring any preliminary treatment. The process of the present invention can also be used for both dilute phosphoric acid called filter grade acid, concentrated phosphoric acid, and even for the so called superphosphoric acids without the need for subjecting these to any preliminary treatment.

It has been discovered that it is particularly advantageous to use phosphoric acid with a low sulphate content. This causes a further reduction in the amounts of precipitant and ketone needed in the process. Thus, preferably, a wet process phosphoric acid with a sulphate content below about 0.6% by weight, calculated in relation to the amount by weight of $P_2O_5$ is employed in the process.

A wet process phosphoric acid with such a low sulphate content can, for example, be obtained by digesting the rock phosphate with an equivalent quantity of sulphuric acid, or even with a deficiency of sulphuric acid. This, however, has certain disadvantages, such as a greatly reduced digestion efficiency and a poor gypsum quality. Therefore, this is not an attractive method.

Another possible method to obtain wet process phosphoric acid with such a low sulphate content is to remove the sulphate from a wet process phosphoric acid obtained by digesting rock phosphate with an excess of $H_2SO_4$, by for example, extracting the sulphate with an organic solvent. Preferably, a sulphate content of below about 0.6% by weight can be achieved by adding to the phosphoric acid a compound that reacts with $SO_4$-ions to form a compound that is insoluble in phosphoric acid, and separating out the precipitate thereby formed. Examples of such compounds are oxides and salts of bivalent metals, such as carbonates, sulphides, nitrates, phosphates and chlorides of calcium, magnesium and barium. Preferably, a calcium compound, barium compound or a mixture thereof that is soluble in phosphoric acid is used as the compound to react with the $SO_4$-ions. Particularly suitable calcium and/or barium compounds are carbonates and sulphides, because when these are used the anions are not left behind in the phosphoric acid. When using a calcium compound as the compound to react with the $SO_4$-ions, it has been discovered that for effecting a faster precipitation of calcium sulphate it is advantageous to accomplish this in the presence of part of the ketone required for the uranium precipitation. Up to about 10% of the total amount of ketone used in the present process may be utilized during the precipitation of the calcium sulphate.

The quantity of compound reactive with $SO_4$-ions to be added is not critical, but does need to be sufficient to react with enough of the sulphate in the phosphoric acid so that the remaining sulphate content is reduced to below about 0.6% by weight, calculated in relation to the quantity by weight of $P_2O_5$. Preferably, the amount of reactive compound utilized is that which is at least equivalent to the amount of sulphate in the phosphoric acid. If a compound reactive with $SO_4$-ions is used that also reacts with other components present in the phosphoric acid, the amount of such compound used should, of course, be adjusted proportionally.

The precipitate formed after the addition of the compound reactive with $SO_4$-ions can be separated form the wet process phosphoric acid in various ways, such as, filtration, centrifugation, and/or decantation. Along with the insoluble compound formed, e.g. calcium sulphate and/or barium sulphate when use is made of calcium compounds and/or barium compounds, the precipitate also contains part of the fluorine compounds and metal contaminants present in the wet process phosphoric acid. Among the factors determining the amount of this contamination of the sulphate precipitate are the type and quantity of the compound used and the type of wet process phosphoric acid used. The precipitate can be upgraded in various ways, optionally with recovery of the original compound reactive with $SO_4$-ions.

The uranium containing precipitate formed in the process of the present invention contains, in addition to uranium, the greater part of the metals present in the wet process phosphoric acid, e.g., magnesium, aluminium, cobalt, vanadium, yttrium, strontium, lead, and rare earth metals, such as lanthanum and cerium. This precipitate can be separated from the mixture of phosphoric acid and ketone in various ways, such as filtration or centrifugation. The uranium containing concentrate recovered may, if so desired, be upgraded by various known methods.

The mixture of phosphoric acid, ketone, and water resulting after recovery of the uranium containing precipitate can be separated in various ways, such as, distillation, decantation and/or extraction. The recovered ketone, whether or not having been subjected to a further treatment such as rectification, can be recycled to the precipitation step.

The remaining phosphoric acid, which is practically free of all metal contaminants, can be used for various purposes, e.g. as a raw material for the preparation of high-grade fertilizer products, technical-grade phosphates, and animal-feed phosphate.

EXAMPLES

The invention will be further elucidated in the following examples:

EXAMPLE I

An amount of 100 grams of wet process phosphoric acid with a $P_2O_5$ content of 53% by weight was introduced into a beaker. To this, 2.4 grams of solid ammoniumbicarbonate was added, after which the mixture was stirred for about 1 minute. Thereafter 4 g of iron wire was added and the mixture stirred for 30 minutes, and subsequently the iron was removed from the liquid with a magnet. While the resulting liquid was being stirred, 212 g of acetone was added to it, whereupon a precipitate formed. After 1 hour's settling the precipitate was filtered off, which yielded 3.5 g of solid substance.

The filtrate was vacuum distilled, yielding acetone as the top product and a phosphoric acid solution as the bottom product.

A measurement showd that more than 90% of the uranium originally contained in the phosphoric acid was precipitated.

EXAMPLES 2-12

In the same way as in Example 1, 100 g of wet process phosphoric acid with a $P_2O_5$ content of 53% by weight was treated with 4 g of iron and varying amounts of ammoniumbicarbonate and organic dispersant.

The results are summarized in Table I below with Example 12 being a comparative example utilizing methanol as the dispersant. The abbreviation MEK stands for methylethylketone.

TABLE I

| Expt. No. | $NH_4HCO_3$ as g $NH_3$ per 100 g $P_2O_5$ | dispersant, g/100 g $P_2O_5$ | Uranium precipitation efficiency, % |
|---|---|---|---|
| 1 | 4.1 g | 400 g acetone | >90 |
| 2 | 4.8 g | 265 g acetone | >90 |
| 3 | 4.8 g | 260 g MEK | >90 |
| 4 | 4 g | 330 g acetone | >90 |
| 5 | 4 g | 330 g MEK | >90 |
| 6 | 3 g | 345 g acetone | >90 |
| 7 | 3 g | 345 g MEK | >90 |
| 8 | 0.35 g | 450 g acetone | >90 |
| 9 | 0.35 g | 460 g MEK | >90 |
| 10 | 0.09 g | 600 g acetone | >90 |
| 11 | 0.09 g | 600 g MEK | >90 |
| 12 | 1 g | 500 g methanol | 60 |

EXAMPLES 13-20

In the same way as in Example 1, 100 g of wet process phosphoric acid, with a $P_2O_5$ content of 30%, was treated with 4 g of iron and varying quantites of ammoniumbicarbonate and organic dispersant.

The results are summarized in Table II below with Example 20 being a comparative example utilizing methanol as the dispersant.

TABLE II

| Expt. No. | $NH_4HCO_3$ as g $NH_3$ per 100 g $P_2O_5$ | dispersant, g.100 g $P_2O_5$ | uranium precipitation efficiency, % |
|---|---|---|---|
| 13 | 1.2 g | 800 g acetone | >90 |
| 14 | 1.2 g | 800 g MEK | >90 |
| 15 | 2.3 g | 633 g acetone | >90 |
| 16 | 3.3 g | 530 g acetone | >90 |
| 17 | 3.3 g | 530 g MEK | >90 |
| 18 | 0.08 g | 900 g acetone | >90 |
| 19 | 0.08 g | 900 g MEK | >90 |
| 20 | 0.35 g | 900 g methanol | 15-20 |

EXAMPLE 21

In the same way as in Example 1, wet process phosphoric acid having a $P_2O_5$ content of 30% by weight was trated with 4 g of iron, an ammonium salt and acetone. The ammonium salt used was a mixture of ammonia and ammonium-nitrate, in an amount corresponding to 2.5 g of $NH_3$ per 100 g of $P_2O_5$. When use was made of 650 g of acetone per 100 g of $P_2O_5$, the uranium precipitation efficiency was >90%.

EXAMPLE 22

An amount of 100 grams of wet process phosphoric acid with a composition as shown in Table III below, was introduced into a beaker. Next 4 grams of iron was added, and the mixture was stirred for thirty minutes, whereupon the iron was removed from the liquid with a magnet. To the remaining liquid 500 mg of solid ammonium fluoride was added, after which the mixture was stirred for about 1 minute. Subsequently, 186 grams of acetone was added while the liquid was being stirred, whereupon a precipitate formed. After 1 hour's settling the precipitate was filtered off, which yielded 6 grams of solid substance.

The filtrate was vacuum distilled, yielding acetone as top product and a phosphoric acid solution as bottom product. The composition of this phosphoric acid was determined and is shown in Table III below.

TABLE III

|  | original phosphoric acid | phosphoric acid after filtration |
|---|---|---|
| $P_2O_5$ | 29.1% | 29.7% |
| $SiO_2$ | 0.72% | 0.14% |
| Al | 0.23% | 0.01% |
| $SO_4$ | 1.5% | 0.9% |
| K | 0.04% | <0.01% |
| Ca | 0.62% | 0.09% |
| Fe | 0.25% | 0.20% |
| F | 1.6% | 0.22% |
| V | 135 ppm | 20 ppm |
| Cd | 10 ppm | <4 ppm |
| Ti | 29 ppm | 7 ppm |
| U | 120 ppm | 16 ppm |

From analytical results it is obvious that the resulting phosphoric acid contained a much lower content of contaminants than the original wet process phosphoric acid.

The uranium content had decreased from 120 to 16 ppm which is an uranium precipitation efficiency of >87%.

EXAMPLE 23

Example 22 was repeated but with the treatment with ammonium fluoride occuring first and next the addition of iron. Filtration of the precipitate yielded an amount of 4 grams of solid substance.

The other results were the same as those of Example 22.

EXAMPLES 24-28

In the same way as in Example 22, 100 grams of wet process phosphoric acid with the same composition as in Example 22 was treated with 4 grams of iron, varying amounts of ammonium fluoride and organic dispersant. The results are summarized in Table IV below.

TABLE IV

| Experiment No. | $NH_4F$ in mg/100 g $H_3PO_4$ | $NH_4F$ in wt. % of $F/P_2O_5$ | dispersant in g/100 g of $H_3PO_4$ | dispersant wt. %/ $P_2O_5$ | uranium precipitation efficiency in % |
|---|---|---|---|---|---|
| 24 | 4000 mg | 6.8% | 48 g acetone | 160 | 95%-98% |
| 25 | 3100 mg | 5.2% | 85 g acetone | 280 | 95%-98% |
| 26 | 860 mg | 1.5% | 186 g acetone | 613 | 95%-98% |
| 27 | 100 mg | 0.17% | 272 g acetone | 897 | 95%-98% |
| 28 | 1200 mg | 2% | 120 g MEK | 396 | 95%-98% |

EXAMPLE 29

In the same way as in Example 22, 100 grams of wet process phosphoric acid with the same composition as in Example 22, was treated with 4 grams of iron, 2500 mg of potassium fluoride (2.8 wt % $F/P_2O_5$) and 160 grams of acetone (528 wt. %/$P_2O_5$). The uranium precipitation efficiency was 90%.

EXAMPLES 30-33

In the same way as in Example 22, 100 grams of wet process phosphoric acid, with a $P_2O_5$ content of 52%, was treated with 4 grams of iron, varying amounts of ammonium fluoride and organic dispersant. The results are summarized in Table V below.

TABLE V

| Experiment No. | NH₄F in mg/100 g H₃PO₄ | NH₄F in wt. % F rel. to P₂O₅ | dispersant in g/100 g H₃PO₄ | dispersant in wt. % rel. to P₂O₅ | uranium precipitation efficiency in % |
| --- | --- | --- | --- | --- | --- |
| 30 | 4400 mg | 4.3% | 112 g acetone | 215% | >90% |
| 31 | 3100 mg | 3.0% | 143 g MEK | 275% | >90% |
| 32 | 1000 mg | 1.0% | 216 g acetone | 415% | >90% |
| 33 | 400 mg | 0.4% | 247 g acetone | 475% | >90% |

EXAMPLE 34

An amount of 100 g of wet process phosphoric acid with a $P_2O_5$ content of 30% and a sulphate content of 1.6% by weight was introduced into a beaker. While this was being stirred, 3.7 g of solid $BaCO_3$ was added, whereupon a precipitate formed. After 1 hour's settling the precipitate was filtered off.

To the filtrate 76 mg of solid ammonium fluoride was added, after which the mixture was stirred for about 1 minute. Subsequently 4 g of iron wire was added and the mixture was stirred for 30 minutes, after which the iron was removed from the liquid with a magnet.

To the remaining liquid, 204 g of acetone was added, whereupon a precipitate formed. After 1 hour's settling the precipitate was filtered off.

The filtrate was vacuum distilled, yielding acetone as top product and a phosphoric acid solution as bottom product. The uranium precipitation efficiency was more than 90%.

EXAMPLES 35–43

In the same way as in Example 34, 100 g of wet phosphoric acid with the same composition as in Example 34 was treated with 3.7 g of $BaCO_3$, 4 g of iron, varying quantities of ammonium fluoride and organic dispersant.

Examples 41, 42 and 43 are comparative examples, in which no $BaCO_3$ was added. The results are summarized in Table VI below.

TABLE VI

| Experiment No. | NH₄ in wt. % F in rel. to P₂O₅ | dispersant in wt. % in rel. to P₂O₅ | uranium precipitation efficiency in % |
| --- | --- | --- | --- |
| 34 | 0.07 | 680 wt. % of acetone | >90 |
| 35 | 0.4 | 560 wt. % of acetone | >90 |
| 36 | 0.5 | 533 wt. % of MEK | >90 |
| 37 | 0.5 | 533 wt. % of acetone | >90 |
| 38 | 1.7 | 350 wt. % of acetone | >90 |
| 39 | 1.7 | 350 wt. % of MEK | >90 |
| 40 | 3.3 | 250 wt. % of acetone | >90 |
| 41 | 1.7 | 590 wt. % of acetone | >90 |
| 42 | 2.2 | 533 wt. % of acetone | >90 |
| 43 | 1.7 | 350 wt. % of acetone | 63 |

EXAMPLES 44–50

In the same way as in Example 34, 100 g of wet process phosphoric acid with a $P_2O_5$ content of 52% and a sulphate content of 2.6% was treated with 4.4 g of solid $BaCO_3$, 4 g of iron and varying quantities of ammonium fluoride and acetone.

Examples 48, 49, and 50 are comparative examples, in which no $BaCO_3$ was added. The results are summarized in Table VII below.

TABLE VIII

| Experiment No. | NH₄F in wt. % F. in rel. to P₂O₅ | acetone in wt. % in rel. to P₂O₅ | uranium precipitation efficiency in % |
| --- | --- | --- | --- |
| 44 | 2.0 | 210 | >90 |
| 45 | 1.9 | 220 | >90 |
| 46 | 0.5 | 400 | >90 |
| 47 | 1 | 270 | >90 |
| 48 | 1.9 | 320 | >90 |
| 49 | 1.5 | 400 | >90 |
| 50 | 1.0 | 270 | 57 |

The compositions of both the wet process phosphoric acid used in Examples 44–50 and the product acid obtained in Examples 46 and 49 were determined.

The results are shown in Table VIII below.

TABLE VIII

|  | original phosphoric acid | phosphoric acid after uranium precipitation without SO₄ removal (Experiment 49) | phosphoric acid after uranium precipitation with SO₄ removal (Experiment 46) |
| --- | --- | --- | --- |
| P₂O₅ | 52% | 51% | 51% |
| SO₄ | 2.6% | 1.7% | 0.1% |
| F | 0.7% | 0.2% | 0.1% |
| Ca | 0.12% | 0.05% | 0.02% |
| Al | 0.25% | 0.01% | <0.01% |
| Fe | 0.2% | 0.2% | 0.2% |
| Cd | 10 ppm | <5 ppm | <3 ppm |

From these analytical results it is obvious that the resulting phosphoric acid after uranium precipitation with prior sulphate removal contained a much lower content of impurities than both the original wet process phosphoric acid and the product after uranium precipitation without prior sulphate removal.

EXAMPLE 51

An amount of 1.88 g of solid calcium carbonate was added to 100 g of wet process phosphoric acid with a $P_2O_5$ content of 30% and a sulphate content of 1.6% by weight which was being stirred. Subsequently, 16 g of acetone was added. After 1 hour's settling the precipitate formed was filtered off, yielding 3.1 g of solid substance.

To the filtrate 250 mg of ammonium fluoride (0.4 wt. % F in relation to $P_2O_5$) was added and, after stirring for about 1 minute, 4 g of iron wire was added. The mixture was stirred for 30 minutes, after which the iron was removed from the liquid with a magnet.

To the remaining solution 140 g of acetone (462 wt. % acetone in relation to $P_2O_5$) was added, whereupon a precipitate formed. After 1 hour's settling the precipitate was filtered off, yielding 4.2 g of solid substance.

The filtrate was vacuum distilled, yielding acetone as top product and a phosphoric acid solution as bottom product. The uranium precipitation efficiency was more than 95%.

We claim:

1. Process for recovering a uranium containing concentrate and a purified phosphoric acid from a wet process phosphoric acid comprising the steps of,
    (a) treating said wet process phosphoric acid first with (i) from about 0.15% to about 7% by weight of ammonium fluoride calculated as fluoride in relation to the amount by weight of $P_2O_5$ in the phosphoric acid, and (ii) a reducing agent, and thereafter with from about 120% to about 900% by weight of an aliphatic ketone calculated in relation to the amount by weight of $P_2O_5$ in the phosphoric acid, to form an uranium containing precipitate,
(b) separating said precipitate from the remaining mixture of phosphoric acid and aliphatic ketone, and
(c) recovering purified phosphoric acid from said mixture of phosphoric acid and aliphatic ketone.

2. The process of claim 1, wherein the aliphatic ketone is selected from the group consisting of acetone, methylethylketone, or mixture thereof.

3. The process of claim 2 wherein the amount of aliphatic ketone is from about 160% to about 450% by weight calculated in relation to the amount of $P_2O_5$ in the phosphoric acid and the amount of ammonium fluoride is from about 0.5% to about 5% by weight calculated as fluorine in relation to the amount by weight of $P_2O_5$ in the phosphoric acid.

4. The process of claim 3 wherein the aliphatic ketone is acetone and the amount of acetone is from about 200% to about 450% by weight calculated in relation to the amount of $P_2O_5$ in the phosphoric acid and the amount of ammonium fluoride is from about 0.5% to about 3% by weight calculated as fluorine in relation to the amount by weight of $P_2O_5$ in the phosphoric acid.

5. Process for recovering a uranium containing concentrate and a purified phosphoric acid from a wet process phosphoric acid containing uranium wherein the sulphate content of said wet process phosphoric acid is less than about 0.6% by weight calculated in relation to the amount by weight of $P_2O_5$ comprising the steps of,
(a) admixing, to a wet process phosphoric acid containing uranium, a compound that reacts with sulphate ions to form a resultant precipitate that is insoluble in phosphoric acid,
(b) separating out the resultant precipitate from the wet process phosphoric acid containing uranium,
(c) treating the wet proces phosphoric acid containing uranium of step (b) first with (i) from about 0.15% to about 7% by weight of ammonium fluoride calculated as fluorine in relation to the amount by weight of $P_2O_5$ in the phosphoric acid, and (ii) a reducing agent and thereafter with from about 120% to about 900% by weight of an aliphatic ketone calculated in relation to the amount by weight of $P_2O_5$ in the phosphoric acid to form a resultant uranium containing precipitate,
(d) separating out said uranium containing precipitate from the remaining mixture of phosphoric acid and aliphatic ketone, and
(e) recovering the phosphoric acid from said mixture of phosphoric acid and aliphatic ketone.

6. Process of claim 5 wherein the amount of aliphatic ketone is from about 160% to about 450% by weight calculated in relation to the amount of $P_2O_5$ in the phosphoric acid and the amount of ammonium fluoride is from about 0.5% to about 5% by weight calculated as fluorine in relation to the amount by weight of $P_2O_5$ in the phosphoric acid.

7. Process of claim 6 wherein the aliphatic ketone is acetone and the amount of acetone is from about 200% to about 450% by weight calculated in relation to the amount of $P_2O_5$ in the phosphoric acid and the amount of ammonium fluoride is from about 0.5% to about 3% by weight calculated as fluorine in relation to the amount by weight of $P_2O_5$ in the phosphoric acid.

8. Process of claim 5 wherein the compound of step (a) is selected from the group consisting of a calcium compound, a barium compound or a mixture thereof.

9. Process of claim 8 wherein the compound of step (a) is selected from the group consisting of calcium carbonate, calcium sulphide, barium carbonate, barium sulphide or mixture thereof.

10. Process of claim 8 wherein an aliphatic ketone is admixed to the admixture of step (a) wherein the amount of said ketone is up to about 10% by weight of the total amount of aliphatic ketone required for the uranium precipitation.

11. Process of claim 8 wherein the amount of compound of step (a) is at least equivalent to the amount of sulphate in the wet process phosphoric acid.

12. Process of claim 8 wherein the aliphatic ketone is selected from the group consisting of acetone, methylethylketone, or mixture thereof.

* * * * *